United States Patent
Yamao et al.

(10) Patent No.: US 12,214,737 B2
(45) Date of Patent: Feb. 4, 2025

(54) GROMMET ASSEMBLY AND WIRE HARNESS

(71) Applicant: YAZAKI CORPORATION, Tokyo (JP)

(72) Inventors: Yoshimichi Yamao, Toyota (JP); Satoshi Yokoyama, Toyota (JP); Akihisa Unoh, Toyota (JP)

(73) Assignee: YAZAKI CORPORATION, Tokyo (JP)

( * ) Notice: Subject to any disclaimer, the term of this patent is extended or adjusted under 35 U.S.C. 154(b) by 164 days.

(21) Appl. No.: 18/317,064

(22) Filed: May 13, 2023

(65) Prior Publication Data

US 2023/0406242 A1   Dec. 21, 2023

(30) Foreign Application Priority Data

Jun. 15, 2022   (JP) ................... 2022-096270

(51) Int. Cl.
   *B60R 16/02*   (2006.01)

(52) U.S. Cl.
   CPC ................. *B60R 16/0222* (2013.01)

(58) Field of Classification Search
   CPC ............... B60R 16/0222; H02G 3/22
   See application file for complete search history.

(56) References Cited

U.S. PATENT DOCUMENTS

| 2021/0239239 A1* | 8/2021 | Haynes | ............... F16L 5/14 |
| 2023/0042371 A1* | 2/2023 | Grall | ............... H02G 3/22 |
| 2024/0274329 A1* | 8/2024 | Ando | ............... B60R 16/0222 |

FOREIGN PATENT DOCUMENTS

JP   2020-74671 A   5/2020

* cited by examiner

*Primary Examiner* — Hoa C Nguyen
*Assistant Examiner* — Amol H Patel
(74) *Attorney, Agent, or Firm* — KENEALY VAIDYA LLP

(57) ABSTRACT

A grommet assembly includes a grommet attached to a through hole formed on a panel, an inner member supported by the grommet, and a protector that is attached to the panel while covering the grommet and the inner member. The grommet includes a supporting part that supports the inner member. The supporting part includes a first extending part that extends from an outer side toward an inner side in a radial direction to be held between the inner member and the protector, and a second extending part that extends in an axial direction while being bent from the first extending part to be held between the inner member and the protector.

5 Claims, 4 Drawing Sheets

GROMMET ASSEMBLY AND WIRE HARNESS

CROSS-REFERENCE TO RELATED APPLICATION(S)

The present application claims priority to and incorporates by reference the entire contents of Japanese Patent Application No. 2022-096270 filed in Japan on Jun. 15, 2022.

BACKGROUND OF THE INVENTION

1. Field of the Invention

The present invention relates to a grommet assembly and a wire harness.

2. Description of the Related Art

In the related art, there are known a grommet assembly and a wire harness obtained by arranging a grommet in a through hole through which the wire harness is inserted as disclosed in Japanese Patent Application Laid-open No. 2020-74671, for example. In these grommet assembly and wire harness, a bracket is attached to a panel, and the grommet is supported by the bracket.

As the grommet assembly and the wire harness, it can be considered that an inner member is mounted on the grommet, and the grommet and the inner member are pressed against the panel by a protector. However, there is concern that a water cutoff function of the grommet is lowered. For example, when a wiring material of the wire harness is strongly pulled, it is assumed that the grommet is deformed, an end part of the grommet is turned up, and the water cutoff function of the grommet is lowered.

SUMMARY OF THE INVENTION

Thus, the present invention aims at providing a grommet assembly and a wire harness that can prevent the grommet from being deformed and secure the water cutoff function.

In order to achieve the above mentioned object, a grommet assembly according to one aspect of the present invention includes a grommet through which a wiring material is inserted, that is attached to a through hole formed on a panel for a vehicle; an inner member that is arranged on an opposite side of the panel for the vehicle with respect to the grommet, and supported by the grommet; and a protector through which the wiring material is inserted, that is attached to the panel for the vehicle while covering the grommet and the inner member, wherein the grommet includes a supporting part that supports the inner member, and the supporting part includes a first extending part that extends from an outer side toward an inner side in a radial direction to be held between the inner member and the protector, and a second extending part that extends in an axial direction while being bent from the first extending part to be held between the inner member and the protector.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes an embodiment according to the present invention in detail based on the drawings. The present invention is not limited to this embodiment. Constituent elements in the following embodiment encompass a constituent element that can be easily replaced by those skilled in the art, or substantially the same constituent element.

Embodiment

Figure 1:
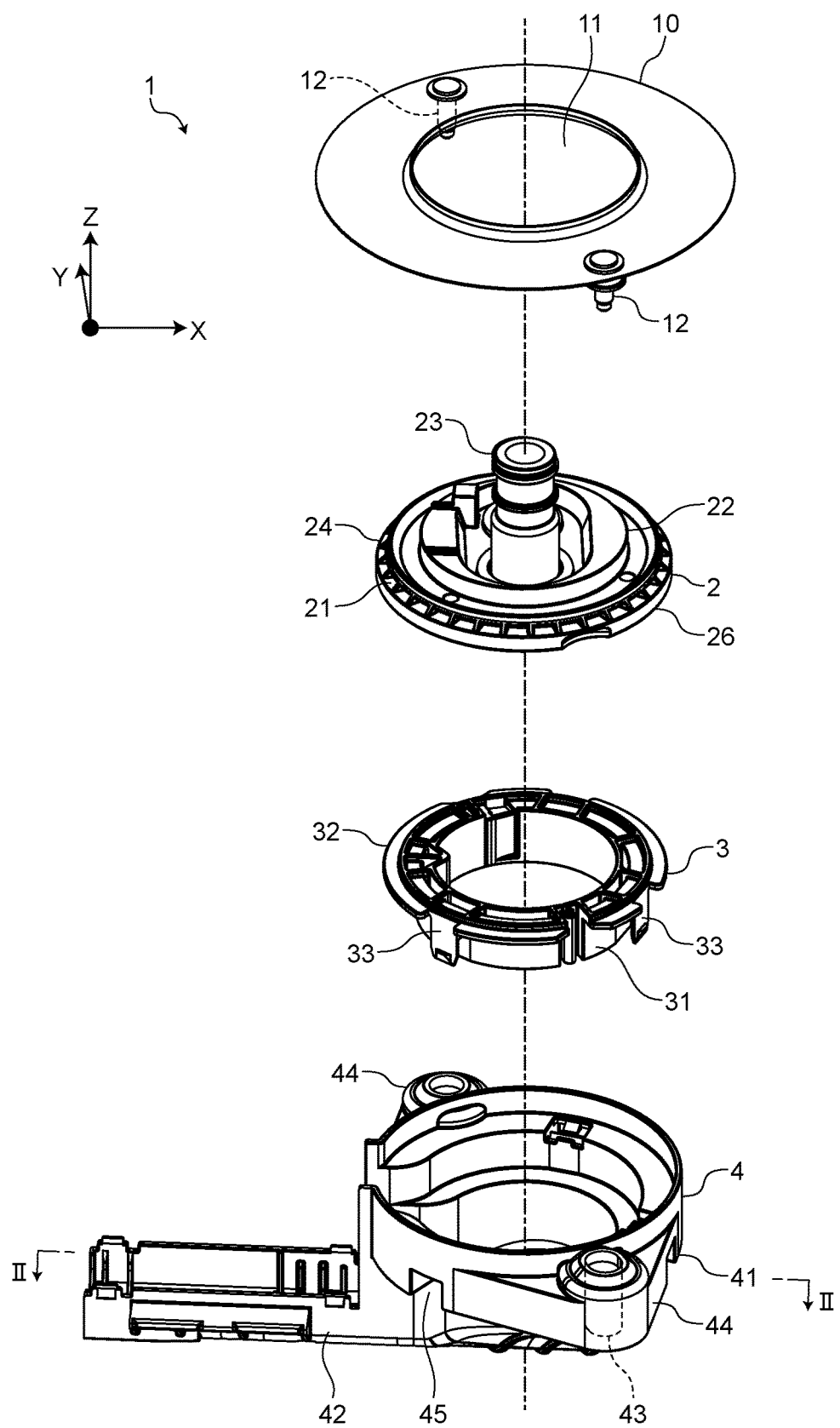
FIG. 1 is an exploded perspective view of a grommet assembly according to an embodiment.
Figure 2:
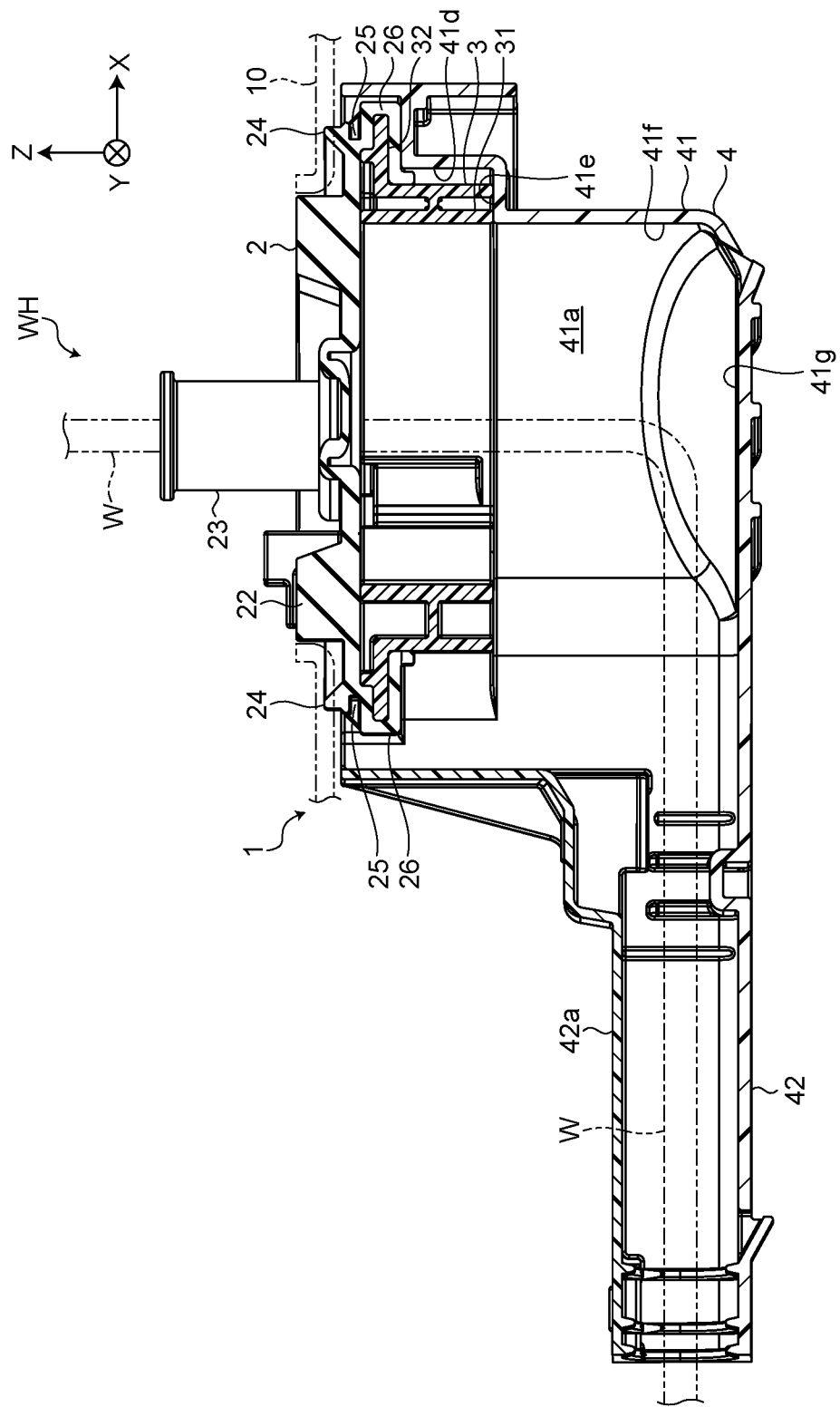
FIG. 2 is a cross-sectional view of the grommet assembly along II-II in FIG. 1 and a wire harness.
Figure 3:
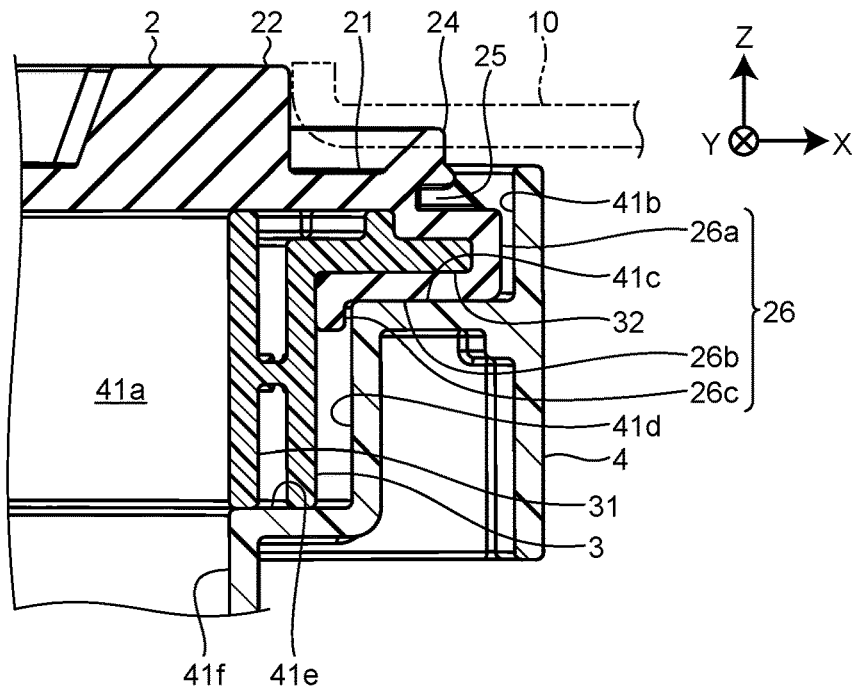
FIG. 3 is an enlarged cross-sectional view of the grommet assembly along II-II in FIG. 1.
Figure 4:
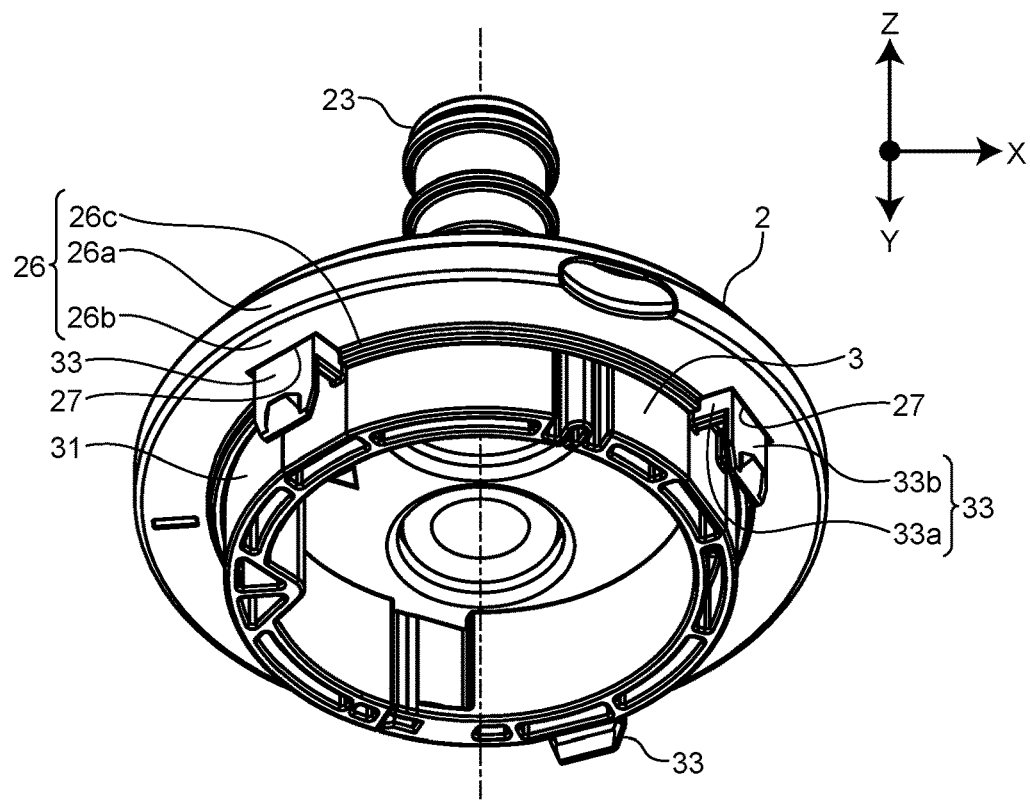
FIG. 4 is a perspective view of a grommet and an inner member in the grommet assembly.
Figure 5:
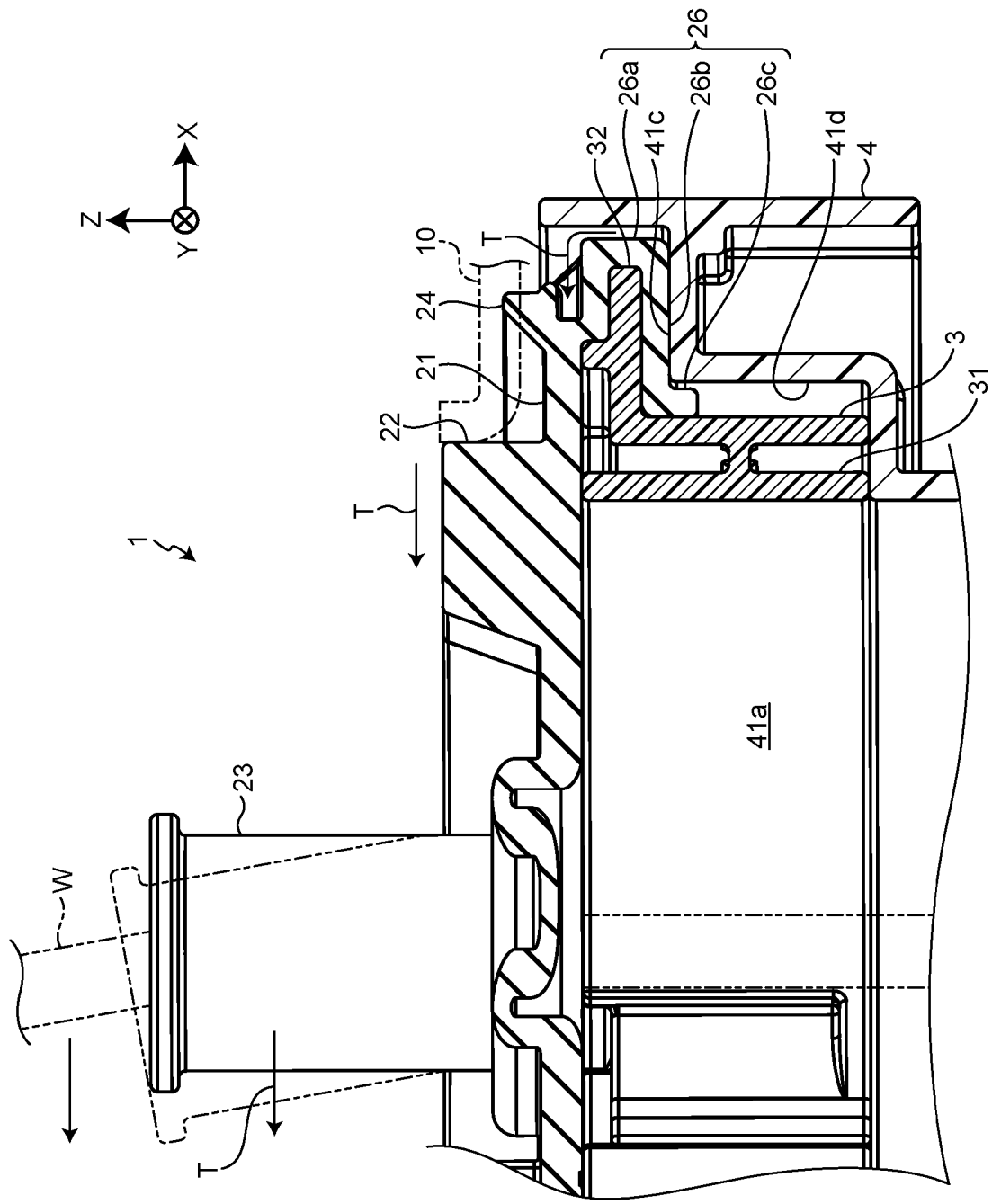
FIG. 5 is an explanatory diagram of a water cutoff function of the grommet.

FIG. 1 is an exploded perspective view of a grommet assembly according to an embodiment, and FIG. 2 is a vertical cross-sectional view of the grommet assembly and a wire harness. FIG. 3 is an enlarged cross-sectional view of a grommet, and FIG. 4 is a perspective view of the grommet and an inner member. FIG. 5 is an explanatory diagram of a water cutoff function of the grommet.

As illustrated in FIGS. 1 and 2, a grommet assembly 1 is an assembly for attaching a grommet 2 to a panel 10, and includes the grommet 2, an inner member 3, and a protector 4. A wire harness WH includes the grommet assembly 1 and a wiring material W. For example, the wire harness WH is configured by incorporating the grommet assembly 1 with the wiring material W routed in a vehicle. Herein, the wire harness WH is obtained by bundling a plurality of the wiring materials W to be a collective component, for example, and electrically connects between devices mounted on the vehicle. The wire harness WH may also include another component such as a corrugated tube and resin tape. The wiring material W has electrical conductivity, connects between devices mounted on the vehicle, and is used for power supply and signal communication. The wiring material W is, for example, constituted of a metal rod, an electric wire, an electric wire bundle, and the like. The metal rod is obtained by covering an outer side of a rod-like member having electrical conductivity with a covering part having an insulation property. The electric wire is obtained by covering an outer side of a conductor part (core wire) constituted of a plurality of metal wires having electrical conductivity with a covering part having an insulation property. The electric wire bundle is obtained by bundling the electric wires.

The panel 10 is a panel for the vehicle, and is a floor panel disposed on a floor portion of a vehicle body, for example. The panel 10 is an attachment target to which the grommet 2 is attached, and constituted of a plate-like member disposed in a horizontal direction. For convenience of explanation, part of the panel 10 is illustrated in a circular shape in FIG. 1. An overall shape of the panel 10 is a shape corresponding to a structure of the vehicle, for example.

A through hole 11 is formed on the panel 10. The through hole 11 is a hole through which the wire harness WH is inserted, and passes through front and back faces of the panel 10 to cause a vehicle exterior side of the panel 10 to communicate with a vehicle interior side thereof. In FIG. 1, a lower side of the panel 10 is the vehicle exterior side, and an upper side thereof is the vehicle interior side. FIG. 1 illustrates a case in which the through hole 11 is opened in a circular shape, but there is a case in which the through hole 11 is opened in a shape other than the circular shape. Bolts 12 are disposed on a lower surface of the panel 10. The bolts 12 are projected from the lower surface of the panel 10 toward a lower side. For example, the two bolts 12 are disposed at positions across the through hole 11, for example. The bolt 12 functions as a fastening member for attaching the protector 4 to the panel 10.

The grommet 2 is a member that is attached to the through hole 11, and covers and protects the wiring material W inserted therethrough. The grommet 2 is, for example, constituted of an elastic body that can be elastically deformed, and constituted of rubber, an elastic resin material, or the like. The grommet 2 fills up a gap between the wiring material W and an inner edge of the through hole 11 to protect the wiring material W, and cuts off water inside and outside the vehicle. The grommet 2 may also function as a member that achieves dustproofing and soundproofing for the vehicle.

The grommet 2 includes a main body part 21, an insertion part 22, and a cylindrical part 23. The main body part 21 is a part arranged on the vehicle exterior side of the panel 10, and is formed to be larger than the through hole 11 to have a disc shape, for example. The insertion part 22 is a part to be inserted through the through hole 11, and is formed to have a size that can be inserted through the through hole 11 and have a round pillar shape or a cylindrical shape, for example. The cylindrical part 23 is a part that covers the wiring material W inserted therethrough, and is projected from the main body part 21 or the insertion part 22 along a passing-through direction of the through hole 11. FIG. 1 illustrates a case in which two cylindrical parts 23 are formed. One or three or more cylindrical parts 23 may be formed in accordance with the number of wiring materials W to be inserted.

A lip part 24, a hollow part 25, and a supporting part 26 are formed on the grommet 2. The lip part 24 is a part abutting on the panel 10, and is projected from the main body part 21 toward the panel 10. The lip part 24 is formed as continuous projections surrounding a periphery of the insertion part 22, for example. When the lip part 24 is pressure-welded to the panel 10, the vehicle interior side and the vehicle exterior side of the through hole 11 are sealed off by the grommet 2, and a water cutoff function of the grommet 2 is exhibited. In other words, in a case in which pressure-welding of the lip part 24 is not appropriately performed due to deformation of the grommet 2, the water cutoff function of the grommet 2 is lowered.

As illustrated in FIG. 3, the hollow part 25 is a hollow space portion in the grommet 2, and formed in a region on the inner member 3 side with respect to the lip part 24. That is, the hollow part 25 is formed in a region on the opposite side of the panel 10 with respect to the lip part 24, and allows the lip part 24 pressure-welded to the panel 10 to be easily bent. For example, the hollow part 25 is formed as a groove extending in a circumferential direction by recessing an outer peripheral portion of the main body part 21 in a radial direction. The lip part 24 is pressed against the panel 10 when the grommet 2 is attached to the panel 10. However, by forming the hollow part 25, the lip part 24 can be bent to move toward the hollow part 25 side before being deformed to be crushed. In the grommet assembly 1 and the wire harness WH according to the present embodiment, the hollow part 25 is not formed in some cases.

The supporting part 26 is a part that supports the inner member 3, and is formed on the inner member 3 side of the main body part 21. That is, the supporting part 26 is formed at a position on the main body part 21 opposite to the panel 10. The supporting part 26 is engaged with the inner member 3, and enables the grommet 2 to be mounted on the inner member 3. For example, the supporting part 26 supports the inner member 3 by covering an outer edge of a flange part 32, and integrates the grommet 2 with the inner member 3. Details of the flange part 32 will be described later.

Specifically, the supporting part 26 includes an outer cylindrical part 26a, a first extending part 26b, and a second extending part 26c. The outer cylindrical part 26a is formed in a cylindrical shape, and covers an outer peripheral portion of the flange part 32. The first extending part 26b is formed to be continuous to the outer cylindrical part 26a, and extends from an outer side toward an inner side in a radial direction to cover a lower surface of the flange part 32. The lower surface of the flange part 32 is a surface of the flange part 32 on the opposite side of the panel 10. That is, the first extending part 26b is formed along the surface of the flange part 32 on the opposite side of the panel 10. The second extending part 26c is formed to be continuous to the first extending part 26b, and bent from the first extending part 26b to extend in an axial direction.

The first extending part 26b and the second extending part 26c are disposed to be held between the inner member 3 and the protector 4. That is, the first extending part 26b is held between the flange part 32 of the inner member 3 and a first parallel surface 41c of the protector 4. The second extending part 26c is held between a main body part 31 of the inner member 3 and a second inner peripheral surface 41d of the protector 4. Details of the first parallel surface 41c and the second inner peripheral surface 41d will be described later. In this way, the first extending part 26b and the second extending part 26c are disposed to be held between the inner member 3 and the protector 4 in a bent state, so that the first extending part 26b and the second extending part 26c hardly come off from between the inner member 3 and the protector 4.

In FIG. 1, the inner member 3 is a member that is attached to the grommet 2. The inner member 3 is, for example, constituted of a resin member, and has higher rigidity than that of the grommet 2. The inner member 3 is arranged to abut on a side of the grommet 2 opposite to the panel 10. Due to this, in a case in which the protector 4 is attached to the panel 10, pressing force from the protector 4 can be received by the inner member 3 to be transmitted to the grommet 2. The inner member 3 may be arranged so that at least part thereof abuts on the side of the grommet 2 opposite to the panel 10, and the other part is not necessarily arranged on the side of the grommet 2 opposite to the panel 10.

The inner member 3 includes the main body part 31, the flange part 32, and locking parts 33. The main body part 31 is formed in a cylindrical shape, and is arranged so that an axial direction agrees with the passing-through direction of the through hole 11. The axial direction is a direction along a center axis of the main body part 31, which is the Z-direction illustrated in the drawing. The wiring material W can be inserted through the main body part 31. The flange part 32 is formed to extend outward in the radial direction from the main body part 31 to be parallel with the panel 10. The radial direction is a radial direction of the main body part 31, which is a direction orthogonal to the axial direction. For example, as illustrated in FIG. 3, the flange part 32 extends outward in the radial direction from a position on the panel 10 side of the main body part 31, and extends to the position of the lip part 24 of the grommet 2. Due to this, when the protector 4 is attached to the panel 10, the lip part 24 can be pressed by the flange part 32 of the inner member 3 having high rigidity, and the grommet 2 can be securely pressed against the panel 10.

In FIG. 1, the main body part 31 and the flange part 32 are disposed in an annular shape, but they may have a structure combining two semi-annular members, for example. In this case, the main body part 31 and the flange part 32 can be divided into two semi-annular members, or can be opened and closed. That is, insertion of the wiring material W is facilitated such that the wiring material W is inserted in a state in which they are opened or divided into two semi-annular members, and they are combined to be the main body part 31 and the flange part 32 having an annular shape thereafter.

As illustrated in FIG. 4, the locking part 33 is a part that is disposed on an outer circumference of the main body part 31 for locking the protector 4. For example, a plurality of the locking parts 33 are disposed. In FIG. 4, three locking parts 33 are disposed at intervals along a circumferential direction of the inner member 3. Two or four or more locking parts 33 may be disposed. The locking part 33 includes an arm 33a and a locking pawl 33b. The arm 33a projects outward in the radial direction from an outer peripheral surface of the main body part 31. The locking pawl 33b is formed to extend in the axial direction from a distal end of the arm 33a. That is, the locking pawl 33b is bent from the arm 33a to extend toward the protector 4 side in the axial direction, and can be locked onto the protector 4. At a distal end portion of the locking pawl 33b, a hook part 33c projecting in the radial direction is formed. In the grommet assembly 1 and the wire harness WH according to the present embodiment, the inner member 3 may be locked on the protector 4 using a member other than the locking part 33.

The locking part 33 of the inner member 3 is disposed to be adjacent to the first extending part 26b and the second extending part 26c. That is, the first extending part 26b and the second extending part 26c are arranged to be adjacent to an end face in a circumferential direction of the locking part 33, and regulates relative rotational movement of the grommet 2 and the inner member 3. Specifically, a recessed part 27 is formed on the first extending part 26b and the second extending part 26c, and the locking part 33 is inserted into the recessed part 27. The recessed part 27 is formed by recessing the first extending part 26b and the second extending part 26c outward in the radial direction so that the locking part 33 can be inserted therein. A plurality of the recessed parts 27 are disposed in accordance with forming positions and the number of formed locking parts 33 in the circumferential direction. That is, the locking part 33 and the recessed part 27 are disposed so that the locking part 33 is inserted into the recessed part 27 in a case in which the inner member 3 is mounted on the grommet 2.

As illustrated in FIGS. 1 and 2, the protector 4 is a member that protects the grommet 2, the inner member 3, and the wiring material W, and regulates a routing path of the wiring material W. The protector 4 is attached to the panel 10 so as to house the grommet 2, the inner member 3, and the wiring material W, and holds the grommet 2 and the inner member 3 between the protector 4 and the panel 10.

The protector 4 includes a base member 40 that covers the grommet 2, the inner member 3, and the wiring material W. The base member 40 includes a first base part 41 and a second base part 42. The first base part 41 is a part that is arranged at a forming position of the through hole 11 to cover and protect the grommet 2 and the inner member 3. The first base part 41 is formed in a cylindrical shape in which an end face on the panel 10 side is opened. In a case in which the protector 4 is attached to the panel 10, the first base part 41 covers the grommet 2 and the inner member 3, and protects the grommet 2 and the inner member 3.

The second base part 42 is formed to be continuous to the first base part 41, and is disposed to project in the radial direction from a side part of the first base part 41. The wiring material W extending from the first base part 41 is inserted through the second base part 42. That is, the wiring material W is inserted through the first base part 41 while being bent from the axial direction to the radial direction, and extends from the first base part 41 to be inserted through the second base part 42. In a case in which the protector 4 is attached to the panel 10, the second base part 42 protects the wiring material W inserted therethrough. FIG. 1 illustrates the protector 4 in a state in which a cover 42a that covers a side surface portion of the first base part 41 and the panel 10 side of the second base part 42 is removed.

In FIGS. 2 and 3, an internal space 41a of the first base part 41 has a round pillar shape, for example, and is a stepped space the inner diameter of which is reduced as being separated from the panel 10. That is, the internal space 41a is defined by a first inner peripheral surface 41b, a first parallel surface 41c, a second inner peripheral surface 41d, a second parallel surface 41e, a third inner peripheral surface 41f, and a bottom surface 41g. That is, in the internal space 41a, inner peripheral surfaces are formed in order of the first inner peripheral surface 41b, the second inner peripheral surface 41d, and the third inner peripheral surface 41f from the panel 10 side. An inner diameter of the second inner peripheral surface 41d is smaller than an inner diameter of the first inner peripheral surface 41b, and an inner diameter of the third inner peripheral surface 41f is smaller than an inner diameter of the second inner peripheral surface 41d. The first parallel surface 41c formed to be parallel with the panel 10 is formed between the first inner peripheral surface 41b and the second inner peripheral surface 41d, and the second parallel surface 41e formed to be parallel with the panel 10 is formed between the second inner peripheral surface 41d and the third inner peripheral surface 41f. Due to this, the internal space 41a has a shape having two steps.

In the internal space 41a, the grommet 2 and the flange part 32 of the inner member 3 are arranged on an inner side of the first inner peripheral surface 41b. The supporting part 26 of the grommet 2 covering the flange part 32 abuts on the first parallel surface 41c. The main body part 31 of the inner member 3 abuts on the second parallel surface 41e. Due to this, when the protector 4 is attached to the panel 10, the grommet 2 can be pressure-welded to the panel 10 via the inner member 3.

In FIG. 1, an insertion hole 43 through which the bolt 12 is inserted is bored on the protector 4. The insertion hole 43 is a hole that is formed in the axial direction, and is formed at a projecting part 44 projected in the radial direction from the outer peripheral surface of the first base part 41, for example. The insertion hole 43 and the projecting part 44 are formed corresponding to arrangement positions of the bolts 12. In FIG. 1, two insertion holes 43 and two projecting parts 44 are formed corresponding to the two bolts 12.

Next, the following describes an assembly method for the grommet assembly and the wire harness according to the present embodiment.

First, as illustrated in FIG. 1, the wiring material W is inserted through the grommet 2. For example, the wiring material W is inserted through the grommet 2 as an elastic body while a diameter of the grommet 2 is expanded. The inner member 3 is then assembled to the wiring material W. For example, the main body part 31 and the flange part 32 of the inner member 3 are divided or opened, and the wiring material W is arranged on an inner side of the inner member 3. When the main body part 31 and the flange part 32 are assembled to each other or closed to have an annular shape, the inner member 3 is assembled to the wiring material W. The wiring material W is then inserted through the protector 4. For example, the cover 42a of the protector 4 is opened, and the wiring material W is inserted through inner parts of the first base part 41 and the second base part 42 of the protector 4. The cover 42a is then closed, and the protector 4 is assembled to the wiring material W.

Thereafter, as illustrated in FIGS. 3 and 4, the grommet 2 is mounted on the inner member 3. That is, the flange part 32 of the inner member 3 is covered by the supporting part 26 of the grommet 2, and the grommet 2 is mounted on the inner member 3. At this point, the inner member 3 and the grommet 2 are joined so that the locking part 33 of the inner member 3 is inserted into the recessed part 27 of the grommet 2. The supporting part 26 covers the flange part 32 from a side surface to a lower surface, so that the flange part 32 can be securely supported. When the locking part 33 is inserted into the recessed part 27, relative rotational movement of the grommet 2 and the inner member 3 is suppressed.

Next, the grommet 2 and the inner member 3 are attached to the protector 4. As illustrated in FIG. 2, the grommet 2 and the inner member 3 are housed in the internal space 41a of the first base part 41. At this point, the grommet 2 and the inner member 3 are housed in the internal space 41a so that the locking pawl 33b of the inner member 3 is inserted into a hole part 45 of the protector 4. When the locking pawl 33b is hooked on a part to be locked of the protector 4, the inner member 3 is locked to the protector 4, and the grommet 2, the inner member 3, and the protector 4 are integrated with each other.

The protector 4 is then attached to the panel 10. As illustrated in FIG. 2, the first base part 41 of the protector 4 is aligned with the position of the through hole 11, and the lip part 24 of the grommet 2 abuts on the panel 10. As illustrated in FIG. 1, when the bolt 12 is inserted through the insertion hole 43 of the protector 4, the protector 4 is arranged at a correct position with respect to the panel 10. The grommet 2 and the inner member 3 are arranged at correct positions with respect to the protector 4, so that arrangement positions of the grommet 2 and the inner member 3 with respect to the panel 10 become correct positions. Due to this, the grommet 2 is attached while being appropriately arranged with respect to the through hole 11 without using a metal plate.

A nut (not illustrated) is screwed onto the bolt 12 to be fastened. Due to this, the protector 4 is brought close to the panel 10 to be fixed. At this point, as illustrated in FIG. 3, the protector 4 presses the grommet 2 via the inner member 3, and the lip part 24 of the grommet 2 is pressure-welded to the panel 10. Due to this, for example, as compared with a case in which a portion as the inner member 3 is an elastic body and configured as part of the grommet 2, excessive deformation of the grommet 2 can be suppressed, and a water cutoff function of the grommet 2 can be appropriately exhibited. That is, if the portion as the inner member 3 is constituted of a member having the same rigidity as that of the grommet 2, the protector 4 presses the entire grommet 2. In this case, stress is applied to the entire grommet 2, and portions other than the lip part 24 are unnecessarily deformed. Due to this, there is the possibility that the grommet 2 cannot exhibit a desired water cutoff function. In contrast, the grommet 2 according to the present embodiment can suppress such a failure, and can exhibit an appropriate water cutoff function.

When the protector 4 is attached to the panel 10, attachment of the grommet 2, the inner member 3, and the wire harness WH is completed, and the wiring material W can be inserted through the through hole 11 of the panel 10 to be arranged.

Next, the following describes the water cutoff function of the grommet assembly and the wire harness according to the present embodiment.

As illustrated in FIG. 2, the grommet 2 is attached to the through hole 11, and the lip part 24 of the grommet 2 is pressed against the panel 10. Due to this, the vehicle interior side and the vehicle exterior side of the panel 10 are sealed off by the grommet 2, and water is prevented from entering the vehicle from the vehicle exterior side to the vehicle interior side via the through hole 11.

Herein, as illustrated in FIG. 5, there is a case in which the wiring material W is pulled. For example, at the time of attachment of the wire harness WH, the wiring material W may be pulled toward a lateral side. At this point, the cylindrical part 23 is also pulled together with the wiring material W, and tensile force T applied to the cylindrical part 23 is transmitted to the supporting part 26 via the main body part 21 and the insertion part 22.

As illustrated in FIG. 3, the supporting part 26 includes the first extending part 26b and the second extending part 26c, and the first extending part 26b and the second extending part 26c are sandwiched and held between the inner member 3 and the protector 4. That is, the first extending part 26b is sandwiched and held between the flange part 32 and the first parallel surface 41c, and the second extending part 26c is sandwiched and held between an outer peripheral surface of the main body part 31 and the second inner peripheral surface 41d. The first extending part 26b and the second extending part 26c are sandwiched and held between the inner member 3 and the protector 4 in a bent state. Due to this, the first extending part 26b and the second extending part 26c are not easily pulled out from between the inner member 3 and the protector 4 even when the tensile force T is applied to the supporting part 26. Thus, with the grommet assembly 1 and the wire harness WH, the supporting part 26 at the end part of the grommet 2 is prevented from being turned up, and the lip part 24 is prevented from being separated from the panel 10. Accordingly, a desired water cutoff function of the grommet 2 can be secured.

The supporting part 26 covers the outer edge of the flange part 32 to support the inner member 3, and extends around the outer edge of the flange part 32 to form the first extending part 26b along a surface on the opposite side of the panel 10. Due to this, the grommet assembly 1 and the wire harness WH have a structure in which the first extending part 26b is hardly pulled out from the panel 10 side. Thus, the grommet assembly 1 and the wire harness WH can prevent the end part of the grommet 2 from being turned up and exhibit a high water cutoff function even when the wiring material W is pulled.

Furthermore, the inner member 3 is arranged to abut on the side of the grommet 2 opposite to the panel 10, and the protector 4 is attached to the panel 10 so as to hold the grommet 2 and the inner member 3 between the protector 4 and the panel 10. Due to this, with the grommet assembly 1 and the wire harness WH, the first extending part 26b can be strongly held between the protector 4 and the inner member 3 when the protector 4 is attached to the panel 10. Thus, the grommet assembly 1 and the wire harness WH can have a structure in which the first extending part 26b hardly comes off from between the protector 4 and the inner member 3, and the water cutoff function of the grommet 2 can be reliably secured.

As described above, in the grommet assembly 1 and the wire harness WH according to the present embodiment, the supporting part 26 of the grommet 2 includes the first extending part 26b that extends from the outer side toward the inner side in the radial direction to be held between the inner member 3 and the protector 4, and the second extending part 26c that is continuous to the first extending part 26b while being bent and extends in the axial direction to be held between the inner member 3 and the protector 4. That is, the first extending part 26b and the second extending part 26c of the supporting part 26 are held between the inner member 3 and the protector 4 in a bent state. Due to this, even in a case in which the tensile force T is applied to the grommet 2 as the wiring material W is pulled, for example, the first extending part 26b and the second extending part 26c are prevented from coming off from between the inner member 3 and the protector 4. Thus, with the grommet assembly 1 and the wire harness WH, the end part of the grommet 2 is hardly turned up, and a desired water cutoff function of the grommet 2 can be secured.

In the grommet assembly 1 and the wire harness WH according to the present embodiment, the supporting part 26 covers the outer edge of the flange part 32 to support the inner member 3, and extends around the outer edge of the flange part 32 to form the first extending part 26b along the surface on the opposite side of the panel 10. Due to this, the grommet assembly 1 and the wire harness WH have a structure in which the first extending part 26b is hardly pulled out from the panel 10 side. Thus, with the grommet assembly 1 and the wire harness WH, the end part of the grommet 2 is more hardly turned up, and a desired water cutoff function of the grommet 2 can be secured.

Furthermore, in the grommet assembly 1 and the wire harness WH according to the present embodiment, the first extending part 26b and the second extending part 26c are arranged to be adjacent to the end face in the circumferential direction of the locking part 33. Due to this, with the grommet assembly 1 and the wire harness WH, relative rotational movement of the grommet 2 and the inner member 3 can be regulated by the supporting part 26 and the locking part 33.

The embodiment of the present invention is exemplified above. However, the embodiment described above is merely an example, and does not intend to limit the scope of the invention. The embodiment described above can be implemented in various other forms, and can be variously omitted, replaced, combined, and modified without departing from the gist of the invention. Additionally, specs such as each configuration and a shape (a structure, a type, a direction, a format, a size, a length, a width, a thickness, a height, the number, arrangement, a position, a material, and the like) can be appropriately changed.

For example, in the above embodiment, described is a case of attaching the grommet assembly 1 and the wire harness WH to the panel 10 as the floor panel of the vehicle, but the embodiment can also be applied to a case of attaching the grommet assembly 1 and the wire harness WH to a panel for a vehicle other than the floor panel or another panel.

With the grommet assembly and the wire harness according to the present embodiment, the grommet can be prevented from being deformed and the water cutoff function can be secured.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A grommet assembly comprising:
a grommet through which a wiring material is inserted, that is attached to a through hole formed on a panel for a vehicle;
an inner member that is arranged on an opposite side of the panel for the vehicle with respect to the grommet, and supported by the grommet; and
a protector through which the wiring material is inserted, that is attached to the panel for the vehicle while covering the grommet and the inner member, wherein
the grommet includes a supporting part that supports the inner member, and
the supporting part includes a first extending part that extends from an outer side toward an inner side in a radial direction to be held between the inner member and the protector, and a second extending part that extends in an axial direction while being bent from the first extending part to be held between the inner member and the protector.

2. The grommet assembly according to claim 1, wherein
the inner member includes a flange part extending outward in a radial direction from a main body part having a cylindrical shape,
the supporting part covers an outer edge of the flange part to support the inner member, and
the first extending part is formed along a surface of the flange part on the opposite side of the panel for the vehicle.

3. The grommet assembly according to claim 2, wherein
the inner member includes a locking part that projects outward in a radial direction from a main body part and locks the protector, and
the first extending part and the second extending part are arranged to be adjacent to an end face of the locking part, and regulate relative rotational movement of the grommet and the inner member.

4. The grommet assembly according to claim 1, wherein
the inner member includes a locking part that projects outward in a radial direction from a main body part and locks the protector, and
the first extending part and the second extending part are arranged to be adjacent to an end face of the locking part, and regulate relative rotational movement of the grommet and the inner member.

5. A wire harness comprising:
a wiring material having electrical conductivity; and
a grommet assembly disposed on the wiring material, wherein
the grommet assembly includes:
a grommet through which the wiring material is inserted, that is attached to a through hole formed on a panel for a vehicle;
an inner member that is arranged on an opposite side of the panel for the vehicle with respect to the grommet, and supported by the grommet; and a protector through which the wiring material is inserted that is attached to the panel for the vehicle while covering the grommet and the inner member, the grommet includes a supporting part that supports the inner member, and the supporting part includes a first extending part that extends from an outer side toward an inner side in a radial direction to be held between the inner member and the protector, and a second extending part that extends in an axial direction while being bent from the first extending part to be held between the inner member and the protector.

\* \* \* \* \*